Oct. 11, 1927.
O. S. HERSHEY
1,644,922
AUTOMOBILE LOCK
Filed Oct. 19, 1925
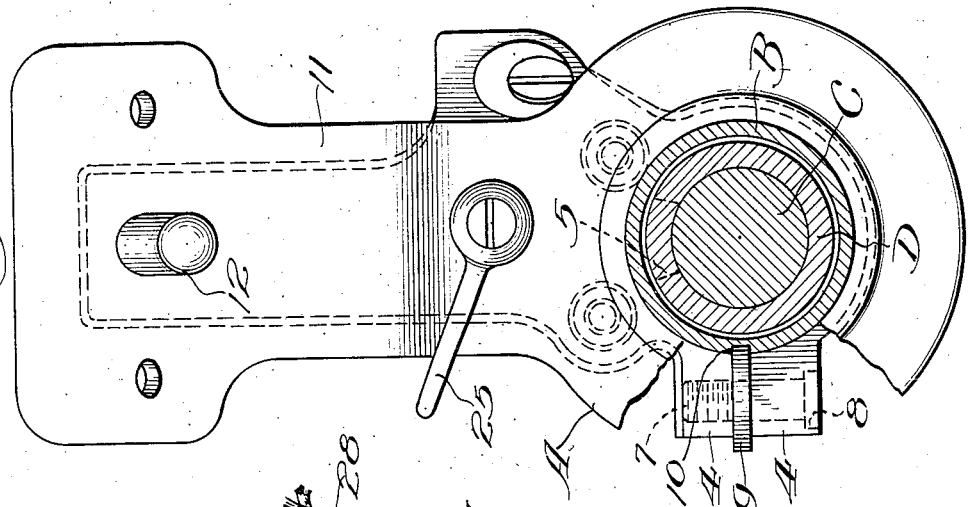
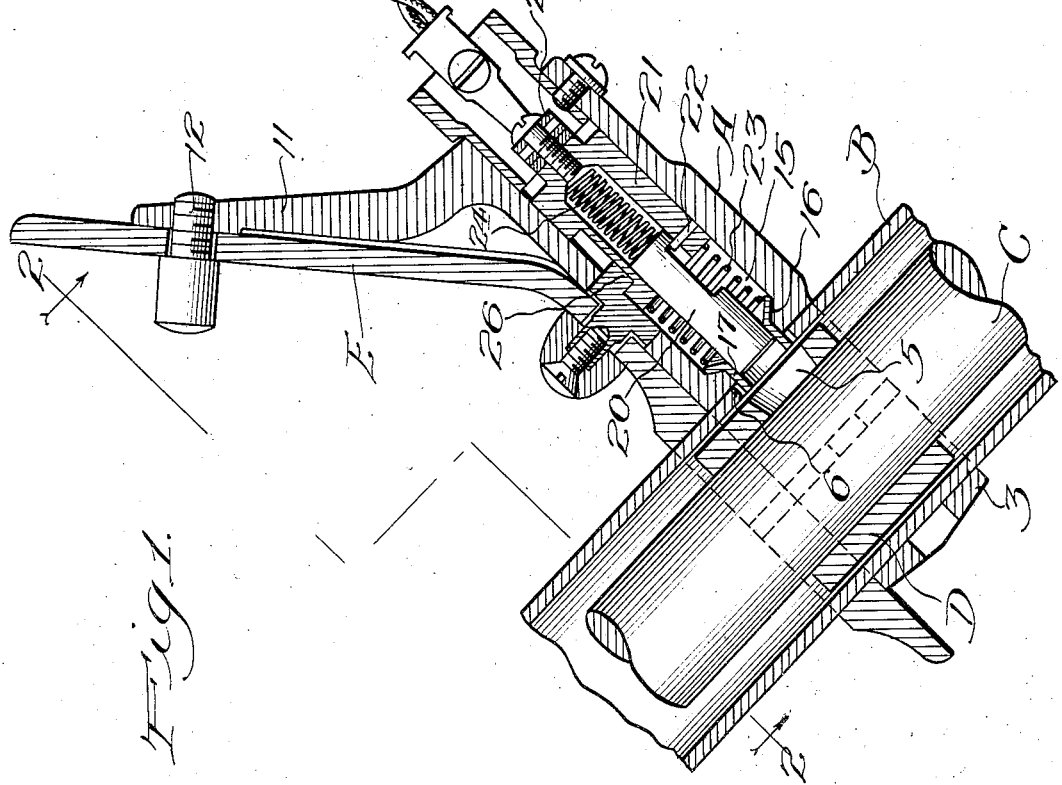
Inventor:
Orville S. Hershey Patented Oct. 11, 1927.

1,644,922

UNITED STATES PATENT OFFICE.

ORVILLE S. HERSHEY, OF CHICAGO, ILLINOIS, ASSIGNOR TO HERSHEY MANUFACTURING COMPANY. OF CHICAGO, ILLINOIS, A CORPORATION OF COLORADO.

AUTOMOBILE LOCK.

Application filed October 19, 1925. Serial No. 63,462.

This invention relates to a lock, adapted especially for automobiles, and is preferably associated with one of the operating units thereof. As shown, it operates in connection with the steering mechanism, but, if desired, it may be connected with a change speed mechanism, a motor ignition circuit, or any other unit or system whose operation is required in the use of the vehicle.

The present lock structure is encased within a suitable housing which may be attached to a fixed part of the vehicle, such as the instrument board, and also to the tubular column through which the steering post is extended. It is highly desirable that the housing be connected to the column in such manner that it may not be rotated thereupon, as otherwise it might be possible to steer the vehicle by breaking the connection with the instrument board, or other fixed support. Accordingly, my present invention is concerned with one or more means for attaching the lock housing to the steering column, or other associated part, in such manner as to prevent relative rotation therebetween at all times and under all conditions.

In the drawing:

Figure 1 is a longitudinal sectional view taken centrally through a lock housing and associated parts; and Fig. 2 which is a front elevation thereof, shows a portion of the structure in section along the line 2—2 of Fig. 1.

The present lock may be contained within a housing A having associated therewith a split collar 3 with outturned lugs 4. Such a collar is adapted to accommodate the tubular column B within which is extended a post C connecting the steering wheel with the swiveled running wheels, usually at the front of an automobile. Secured fast to the post is a collar D having therein a groove or socket 5 which may be brought into register with an opening 6 which is formed in the collar.

Extending between the two collar lugs 4 is a screw 7 provided originally with a twist-off head designed to leave a shoulder 8 disposed within a suitable seat, as shown. Between the two lugs of the collar may be inserted a washer 9 of such diameter that a portion of its periphery will lie within a slot 10 which is formed exteriorly of the tubular column. With the parts related as shown in Fig. 2, the column is positively locked against rotation relative to the collar.

The lock housing is further provided with an upwardly extending tongue 11 adapted to lie rearwardly of the dash or instrument board E to which it may be connected by one or more screws 12. Within the lock housing is formed a chamber 15 at one end of which is an annular shoulder 16 providing a constricted opening which registers with the column opening 6. To lock the column against rotation relative to the lock housing, a bushing 17 is placed within the chamber so as to seat against the shoulder 16 at the end thereof. The walls of this bushing may protrude through the column, as shown. To lock the column against rotation relative to the housing, either the washer 9 or bushing 17 may be used, or, if desired, one may be used to supplement the other. In either case, the lock is positive and is not subject to tampering.

Within the chamber 15 is placed any suitable locking mechanism. As shown, it comprises a bolt 20 slidable within a hollow plunger 21 provided with stop means 22 for normally preventing complete separation of these parts. A compression spring 23 which bears against the bushing tends normally to retract the plunger, together with the bolt, from locking position, while a second compression spring 24 acts in opposition thereto to move the bolt forwardly into locking position when the plunger is also advanced. The acting end of the bolt is extended through the bushing 17 which serves as a guide therefor. Operating means by which the plunger movements are controlled may comprise a handle 25 having an operative connection with an eccentric pin or cam 26 which engages with a shoulder of the plunger to advance the same when the handle is moved to a predetermined position. I may also associate with the plunger a switch 27 which is interposed in an electrical circuit including wires 28. As such details form no part of the present invention, it is thought unnecessary to describe the same with greater particularity.

Not only does my present invention provide a sure means of preventing rotation of the column within the housing, but the assembly of its several parts is very simple indeed. If the washer 9 be used, it is interposed between the two lugs 4 when the screw 7 is inserted preliminary to clamping the collar upon the column. No further attention need be paid to this washer, since it is permanently secured when the screw head is twisted off. With a locking means such as the bushing 17, complete protection is afforded by the walls of the housing. It is necessary merely that this bushing be dropped into place during assembly of the locking mechanism, after which it is held against movement of any kind by pressure from the compression spring 23 which bears directly upon it. It is only when a disassembly has been made of the locking mechanism that this bushing is removable.

The means herein described may be advantageously used with various forms of locks when there is need of preventing rotation between a housing which is mounted exteriorly upon a part which possibly might be turned. As shown, the invention is simple in every respect, and is amply effective to perform its intended work.

I claim:

1. In combination with a tube, a lock housing having a fixed connection with a stationary support, the housing being provided with a split collar which surrounds the tube, screw means for drawing together the two collar ends whereby the housing may be clamped upon the tube, and a washer through which the screw means is extended lying between the two collar ends with a portion of itself extended into the tube body in a manner whereby the tube is held positively against rotation relative to the housing, substantially as described.

2. In combination with a tube, a lock housing having a fixed connection with a stationary support, a locking mechanism within the housing including a bolt movable toward and from the tube adapted, when in advanced position, to project its forward end through an opening in the tube, a bushing surrounding the bolt and extended also within the tube opening to prevent relative rotation between the housing and tube, means providing a seat against which the bushing is rested, and spring means holding the bushing to its seat and adapted also to retract the locking bolt from its forward position, substantially as described.

3. In combination with a tube, a lock housing having a split collar which surrounds the tube, screw means for drawing together the two collar ends whereby the housing may be clamped upon the tube, and means between the two collar ends having a portion of itself extended into the tube body in a manner whereby the tube is held positively against rotation relative to the housing, substantially as described.

4. In combination with a tube, a housing in which is contained a locking mechanism including a bolt movable toward and from the tube adapted, when in advanced position, to project its forward end through an opening in the tube, a bushing surrounding the bolt and extended also within the tube opening to prevent relative rotation between the housing and tube, means providing a seat against which the bushing is rested, and spring means holding the bushing to its seat and adapted also to retract the locking bolt from its forward position, substantially as described.

ORVILLE S. HERSHEY.